United States Patent Office 2,771,391
Patented Nov. 20, 1956

2,771,391

PHYSIOLOGICALLY ACTIVE p-ALKOXY-BETA-PIPERIDINOPROPIOPHENONES CAUSING CNS DEPRESSANT AND ANESTHETIC EFFECTS IN ANIMALS

Earl R. Bockstahler, Indianapolis, Ind., assignor to Allied Laboratories, Inc., Kansas City, Mo., a corporation of Delaware No Drawing. Application August 20, 1953,
Serial No. 375,548

8 Claims. (Cl. 167—53)

This invention relates to substantially pure p-alkoxy-beta-piperidinopropiophenones, having the following general formula:

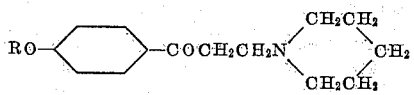

wherein R represents an alkyl group containing from two to eight carbon atoms and the acid addition salts of such compounds. The said compounds when substantially free from impurities being characterized in that the bases are viscous liquid substances and the salts with non-toxic acids are white crystalline substances.

An object of the present invention is the provision of p-alkoxy-beta-piperidinopropiophenones and their salts with acids substantially free from impurities and useful as physiologically active compounds.

It is an important advantage of the present invention that a class of compounds are provided which possess the unique physiological ability to control the canine tremor-rigidity syndrome (post-distemper chorea syndrome).

It is another advantage of this invention that the compounds when substantially free from impurities are effective as local anesthetic agents. They are also useful in domestic animals as epidural anesthetic agents.

Another object of the present invention is the provision of pharmaceutical preparations containing as an active ingredient a compound represented by the general formula given above.

The products of my invention may be prepared by reacting an appropriate p-alkoxyacetophenone with piperidine hydrochloride and formaldehyde. The reaction may be very conveniently carried out by heating the three components in an aqueous medium or in a mixture of water and methanol or other water miscible alcohols. When it is desired, the formaldehyde may be supplied as the solid polymer, paraformaldehyde or trioxymethylene, in which case, an organic solvent should be employed as the reaction medium. Suitable solvents include ethanol, isoamyl alcohol or mixtures of these with toluene or benzene and nitrobenzene, nitroethane, and nitromethane.

The desired products are substantially freed from reaction impurities by conversion to and recovery of the crystalline hydrochlorides. The hydrochloric acid addition compounds may be converted to a substantially pure free base by treatment with an appropriate basic substance. The free p-alkoxy-beta-piperidinopropiophenone can then be converted to other acid addition salts by treatment with an appropriate non-toxic acid such as sulfuric, phosphoric, lactic, citric and the like.

Therapeutic compositions utilizing the bases and salts of this invention comprise the incorporation of the base or salt with a suitable pharmaceutical carrier and with or without other therapeutic agents. The pharmaceutical carrier can comprise a single substance such as water, an oil, a grease, a polyester, a powder, aqueous alcoholic mixtures, aqueous jellies, etc. Generally the base and/or salt will be present in a minor proportion and the carrier will comprise a major portion of the pharmaceutical preparations.

More specifically, the pharmaceutical preparations contemplated by the present invention include those containing from about 0.1 percent to 5 percent of a compound represented by the above general formula in a non-toxic non-sensitizing pharmaceutical carrier. For some uses my new compounds are used in the form of their salts in aqueous solutions preferably in a concentration of from about 0.1 to 1 percent. When the compositions are for topical use, it is preferred that the compounds in a concentration of from about 0.5 to 5 percent be incorporated in a suitable ointment base.

The following examples will serve to illustrate representative types of pharmaceutical carriers that have been used in preparing satisfactory preparations. The examples given employ the base and the salt as prepared in Example 1 i. e. 4-n-butoxy-beta-piperidinopropiophenone or the hydrochloride. It is understood, however, that other bases and salts can be used to replace all or part of those shown in the following illustrations.

A. Two grams of 4-n-butoxy-beta-(1-piperidyl)propiophenone hydrochloride is dissolved in 100 cc. of distilled water and the pH adjusted to 4.0 by the careful addition of hydrochloric acid. This solution is satisfactory for intravenous use in controlling the canine tremor-rigidity syndrome in dogs.

B. A solution prepared as described in (A) having added thereto 0.36 g. of sodium chloride and 2.5 percent benzyl alcohol is satisfactory for use as epidural anesthetic agent.

C. Another solution suitable for epidural use comprises 1% 4-n-butoxy-beta-(1-piperidyl)propiophenone hydrochloride and 2.5 percent benzyl alcohol in distilled water. If desired, a vasoconstrictor such as phenylephrine hydrochloride can be added to this preparation.

D. A solution suitable for use as a local anesthetic in eyes comprises 1 percent 4-n-butoxy-beta-(1-piperidyl)propiophenone hydrochloride and 1.5 percent benzyl alcohol in distilled water.

E. Same as D except 0.5 percent 4-n-butoxy-beta-(1-piperidyl)propiophenone hydrochloride.

F. A liquid oily preparation for topical use is prepared by incorporating 1% 4-n-butoxy-beta-(1-piperidyl)-propiophenone base in sesame oil containing a stoichiometric amount of stearic acid.

G. A water dispersible base for topical use is prepared by incorporating 1 percent 4-n-butoxy-beta-(1-piperidyl)-propiophenone hydrochloride in a mixture of 60 percent poly-ethylene-glycol-dilaurate with 10 percent poly-ethylene-glycol-distearate and liquid petrolatum sufficient to make 100 percent.

H. A vanishing cream type preparation for topical use is prepared by incorporating 1 percent 4-n-butoxy-beta-(1-piperidyl) propiophenone hydrochloride in 30 percent stearic acid emulsified with a small quantity of potassium stearate and petrolatum in sufficient quantity to make 100%.

I. A non-grease base type preparation is prepared by incorporating 1 percent 4-n-butoxy-beta-(1-piperidyl)-propiophenone hydrochloride in poly-ethylene-glycol molecular weight 1500 (Carbowax 1500) softened with a lower melting poly-ethylene-glycol molecular weight 400 (Carbowax 400).

J. Tablets each containing 100 mg., 200 or 300 mg. of 4-n-butoxy-beta-(1-piperidyl)propiophenone hydrochloride have been prepared by granulating the requisite amount of material with a mixture of starch and lactose and compressing into tablets.

In any of the foregoing pharmaceutical preparations illustrated, any other one or combination of my new compounds may be substituted in whole or part for those employed as an active ingredient, and the total quantity of said active ingredient varied from about 0.1 percent to 5 percent.

The non-toxic, relatively non-sensitizing carriers employed may likewise be replaced in whole or part by other suitable carriers possessing these properties and compatible with my novel compounds.

The following specific examples will illustrate methods for the production of my new compounds and the essential intermediate compounds.

EXAMPLE 1

*4-n-butoxy-beta-piperidinopropiophenone hydrochloride*

A mixture of 17.6 gm. of p-n-butoxyacetophenone, 12.1 gm. of piperidine hydrochloride, 4.5 gm. paraformaldehyde, 0.25 cc. concentrated hydrochloric acid, 52.5 cc. nitroethane, 7.5 cc. of 95% ethanol, and 15 cc. of toluene was boiled under reflux for one hour, removing water formed in the reaction by means of a condensate trap. The mixture was then cooled. The crystals which formed were collected by filtration, washed with anhydrous ether and recrystallized from methyl ethyl ketone. The crystals thus obtained, which melted at 174–175° C., were shown by analysis to be 4-n-butoxy-beta-piperidinopropiophenone hydrochloride.

EXAMPLE 2

*4-n-octyloxy-beta-piperidinopropiophenone hydrochloride*

A mixture of 193 gm. of n-octyl bromide, 150 gm. of p-hydroxyacetophenone, 117 gm. anhydrous sodium carbonate, 2 gm. potassium iodide and 100 cc. 95% ethanol was refluxed for 64 hours. The mixture was then poured into an excess of 5% aqueous sodium hydroxide, and the oily layer was separated and dried over sodium sulfate, then distilled under reduced pressure, collecting the material which distilled at 190–195° C. at 6 mm. pressure. This product, a colorless liquid, was 4-n-octyloxyacetophenone.

A mixture of 24.8 gm. of p-n-octyloxyacetophenone, 12.2 gm. of piperidine hydrochloride, 4.5 gm. of paraformaldehyde, 0.23 cc. concentrated hydrochloric acid, 47 cc. nitroethane, 7 cc. ethanol, and 15 cc. toluene was boiled under reflux, with stirring for one hour removing water formed in the reaction by means of a condensate trap, then cooled and diluted with dry ether to about 300 cc. The crystals which formed were filtered off and washed with dry ether, then recrystallized from methyl ethyl ketone. The crystalline product thus obtained, which had a melting point of 145–146° C., was shown by analysis to be 4-n-octyloxy-beta-piperidinopropiophenone hydrochloride.

EXAMPLE 3

*4-ethoxy-beta-piperidinopropiophenone hydrochloride*

A mixture of 28.7 gm. of p-ethoxyacetophenone, 36.3 gm. piperidine hydrochloride, 13.5 gm. paraformaldehyde, 0.75 cc. concentrated hydrochloric acid, 157.5 cc. nitromethane, 22.5 cc. ethanol and 45 cc. of toluene was boiled under reflux for one hour, removing water formed in the reaction by means of a condensate trap, then cooled and allowed to stand. The crystals which formed were collected by filtration and recrystallized from methyl ethyl ketone. The crystalline product thus obtained, which had a melting point of 179.5–180.5° C., was shown by analysis to be 4-ethoxy-beta-piperidinopropiophenone hydrochloride.

EXAMPLE 4

*4-n-amoxy-beta-piperidinopropiophenone hydrochloride*

A mixture of 177 gm. of p-hydroxyacetophenone, 145 gm. of sodium carbonate, 206 gm. n-amyl bromide, 2 gm. of potassium iodide and 300 cc. 95% ethanol was boiled under reflux for 40 hours, then poured into excess 5% aqueous sodium hydroxide solution. The oily layer was separated, washed with water, dried over sodium sulfate, and distilled under reduced pressure, collecting the material which distilled at 126–130° C. at 2 mm. pressure. This product, a colorless liquid, was p-n-amoxyacetophenone.

A mixture of 36 gm. of p-n-amoxyacetophenone, 36.3 gm. of piperidine hydrochloride, 13.5 gm. of paraformaldehyde, 0.75 cc. of concentrated hydrochloric acid, 157.7 cc. of nitromethane, 22.5 cc. of 95% ethanol and 45 cc. of toluene was boiled under reflux for one hour, then cooled. After dilution of the mixture with isopropyl ether, a crop of crystals formed. These were collected by filtration and recrystallized from methyl ethyl ketone. The crystalline product, which had a melting point of 155.5–157° C., was shown by analysis to be 4-n-amoxy-beta-piperidinopropiophenone hydrochloride.

EXAMPLE 5

*4-isobutoxy-beta-piperidinopropiophenone hydrochloride*

A mixture of 422 gm. of isobutyl bromide, 400 gm. of p-hydroxyacetophenone, 328 gm. of potassium carbonate, 2 gm. of potassium iodide and 300 cc. 95% ethanol was boiled under reflux for six days, then cooled and poured into excess 5% aqueous sodium hydroxide solution. The oily layer was separated, washed with water, dried over sodium sulfate and distilled under reduced pressure, collecting the material which distilled at 115–118° C. at 2 mm. This product, a colorless liquid, was p-isobutoxyacetophenone.

A mixture of 52.8 gm. of p-isobutoxyacetophenone, 36.3 gm. of piperidine hydrochloride, 13.5 gm. of paraformaldehyde, 0.75 cc. concentrated hydrochloric acid, 157.5 cc. of nitromethane, 22.5 cc. of 95% ethanol, and 45 cc. of toluene was boiled under reflux for one hour, collecting the water formed in the reaction in a condensate trap. The mixture was then cooled and the crystals which formed were collected by filtration, then recrystallized from methyl ethyl ketone. The crystalline product thus obtained, 4-isobutoxy-beta-piperidinopropiophenone hydrochloride, had a melting point of 172–174° C.

EXAMPLE 6

*4-sec-butoxy-beta-piperidinopropiophenone hydrochloride*

A mixture of 445 gm. of sec-butyl bromide, 422 gm. of p-hydroxyacetophenone, 346 gm. sodium carbonate, 2 gm. of potassium iodide and 400 cc. of 95% ethanol was boiled under reflux for six days, then cooled and poured into excess 5% aqueous sodium hydroxide solution. The oily layer was separated, washed with water, dried over sodium sulfate, and distilled under reduced pressure, collecting the material which boiled at 137–140° C. at 2 mm. pressure. This product, a colorless liquid, was p-sec-butoxyacetophenone.

A mixture of 52.8 gm. of p-sec-butoxyacetophenone, 36.3 gm. of piperidine hydrochloride, 13.5 gm. of paraformaldehyde, 0.75 cc. of concentrated hydrochloric acid, 157.5 cc. of nitromethane, 22.5 cc. of 95% ethanol and 45 cc. of toluene was boiled under reflux for one hour, collecting the water formed in the reaction in a condensate trap. The mixture was then cooled and diluted with isopropyl ether. The crystals which formed were collected by filtration and recrystallized from methyl ethyl ketone and acetone. The crystals were then dissolved in water and made alkaline with sodium carbonate. The oily base which separated was taken up in petroleum ether, and dried over sodium sulfate, after which dry gaseous hydrochloric acid was passed in until precipitation was complete. The solid which resulted was recrystallized from acetone. The crystalline product thus obtained, 4-sec-butoxy-beta-piperidinopropiophenone hydrochloride, had a melting point of 166–167° C.

EXAMPLE 7

4-n-propoxy-beta-piperidinopropiophenone hydrochloride

A mixture of 313 gm. of p-hydroxyacetophenone, 325 gm. of n-propyl bromide, 278 gm. of sodium carbonate, 5 gm. of potassium iodide and 300 cc. of 95% ethanol was boiled under reflux for 48 hours, then cooled and poured into excess 5% aqueous sodium hydroxide solution. The oily layer was separated, washed with water, dried over sodium sulfate and distilled under reduced pressure, collecting the material which distilled at 112–115° C. at 2 mm. pressure. This product, a colorless liquid, was p-n-propoxyacetophenone.

A mixture of 49 gm. of p-n-propoxyacetophenone, 36.3 gm. of piperidine hydrochloride, 13.5 gm. of paraformaldehyde, 0.75 cc. of concentrated hydrochloric acid, 157.5 cc. of nitromethane, 22.5 cc. of 95% ethanol, and 45 cc. of toluene was boiled under reflux for one hour, collecting the water formed in the reaction in a condensate trap. The mixture was then cooled and diluted with isopropyl ether. The crystals which formed were collected by filtration and recrystallized from methyl ethyl ketone and acetone, then dissolved in water and made alkaline with sodium carbonate. The oily base which separated was taken up in petroleum ether and dried over sodium sulfate. Dry hydrochloric acid gas was passed in until precipitation was complete, and the solid formed was recrystallized from acetone. The crystalline product thus obtained, 4-n-propoxy-beta-piperidinopropiophenone hydrochloride, had a melting point of 165–166° C.

EXAMPLE 8

4-isoamoxy-beta-piperidinopropiophenone hydrochloride

A mixture of 350 cc. of carbon disulfide and 140 gm. of aluminum chloride was cooled to 15° C. in an ice bath. Cooling was continued and the mixture was stirred mechanically while a solution of 164 gm. of isoamyl phenyl ether and 78 gm. of acetyl chloride in 150 cc. of carbon disulfide was added at such a rate that the temperature of the mixture remained at 15° to 18° C. After completion of the addition, the mixture was stirred at room temperature for five hours, then poured into a mixture of ice and 100 cc. of concentrated hydrochloric acid, with stirring. The carbon disulfide was removed by steam distillation, and the oily layer of the residue taken up in ether, washed with 5% aqueous sodium hydroxide solution and water, dried over calcium chloride and distilled under reduced pressure, collecting the material which boiled at 152–154° C. at 6 mm. This product, a colorless liquid, was p-isoamoxyacetophenone.

A mixture of 72 gm. of p-isoamoxyacetophenone, 72.6 gm. of piperidine hydrochloride, 27 gm. of paraformaldehyde, 1.5 cc. of concentrated hydrochloric acid, 315 cc. of nitromethane, 45 cc. of 95% ethanol and 90 cc. of toluene was boiled for one hour under reflux, removing water formed in the reaction by means of a condensate trap. The mixture was then cooled, and diluted with isopropyl ether. The crystals which formed were collected by filtration and recrystallized from acetone. The crystalline product, 4-isoamoxy-beta-piperidinopropiophenone hydrochloride, had a melting point of 173–175° C.

EXAMPLE 9

4-isopropoxy-beta-piperidinopropiophenone hydrochloride

A mixture of 49 gm. of p-isopropoxyacetophenone, 36.3 gm. of piperidine hydrochloride, 13.5 gm. of paraformaldehyde, 0.75 cc. of concentrated hydrochloric acid, 157.5 cc. of nitromethane, 22.5 cc. of 95% ethanol and 45 cc. of toluene was refluxed for one hour, collecting the water formed in the reaction in a condensate trap. The mixture was then cooled, and diluted with isopropyl ether. The resulting crystals were collected by filtration, and recrystallized from methyl ethyl ketone. The crystalline product thus obtained, 4-isopropoxy-beta-piperidinopropiophenone hydrochloride, had a melting point of 181.5–183° C.

EXAMPLE 10

4-n-heptyloxy-beta-piperidinopropiophenone hydrochloride

A mixture of 179 gm. of n-heptyl bromide, 136 gm. of p-hydroxyacetophenone, 106 gm. of sodium carbonate, 2 gm. of potassium iodide and 300 cc. 95% ethanol was boiled under reflux for 48 hours, then cooled and poured into excess 5% aqueous sodium hydroxide solution. The oily layer which resulted was separated, washed with water, dried over sodium sulfate, and distilled under reduced pressure, collecting the material which boiled at 152–155° C. at 2 mm. This product, a colorless oil, was p-n-heptyloxyacetophenone.

A mixture of 70.2 gm. of p-n-heptyloxyacetophenone, 36.3 gm. of piperidine hydrochloride, 13.5 gm. of paraformaldehyde, 0.75 cc. of concentrated hydrochloric acid, 157.5 cc. of nitromethane, 22.5 cc. of 95% ethanol and 45 cc. of toluene was refluxed for one hour, then cooled and diluted with isopropyl ether. The resulting crystals were collected by filtration, and recrystallized from methyl ethyl ketone. The crystalline product thus obtained, 4-n-heptyloxy-beta-piperidinopropiophenone hydrochloride, had a melting point of 146–148° C.

EXAMPLE 11

4-n-hexyloxy-beta-piperidinopropiophenone hydrochloride

A mixture of 200 gm. of p-hydroxyacetophenone, 242 gm. of n-hexyl bromide, 156 gm. of sodium carbonate, 2 gm. of potassium iodide, and 100 cc. of 95% ethanol was boiled under reflux for 64 hours, then cooled and poured into excess 5% sodium hydroxide solution. The oily layer which formed was separated, washed with water, dried over sodium sulfate and distilled under reduced pressure, collecting the material which boiled at 170–173° C. at 6 mm. pressure. This product, a colorless liquid, was p-n-hexyloxyacetophenone.

A mixture of 60.5 gm. of p-n-hexyloxyacetophenone, 36.3 gm. of piperidine hydrochloride, 13.5 gm. of paraformaldehyde, 0.75 cc. of concentrated hydrochloric acid, 157.5 cc. of nitromethane, 22.5 cc. of 95% ethanol and 45 cc. of toluene was boiled under reflux for one hour, collecting the water formed in the reaction in a condensate trap. The mixture was then cooled, and diluted with isopropyl ether. The resulting crystals were collected by filtration and recrystallized from acetone. The solid was then dissolved in water and made alkaline with sodium carbonate. The resulting oily base was taken up in petroleum ether and dried over sodium sulfate. Dry hydrochloric acid gas was passed in until precipitation was complete, and the resulting solid was recrystallized from a mixture of methyl ethyl ketone and benzene. The crystals thus obtained, 4-n-hexyloxy-beta-piperidinopropiophenone hydrochloride, had a melting point of 152–154° C.

The present application is a continuation-in-part of my co-pending application Serial No. 230,851, filed June 9, 1951, now abandoned.

I claim:

1. A compound of the group consisting of those represented by the following general formula:

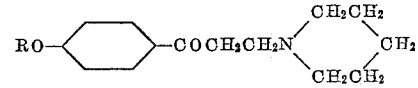

where R represents an alkyl group containing from two to eight carbon atoms, and their salts with acids being substantially free from impurities and being characterized in that they possess the physiological ability to exert a local anesthetic effect, an epidural anesthetic effect in domestic animals and the ability to control the canine tremor-rigidity syndrome.

2. The compound 4-n-butoxy-beta-(1-piperidyl)propiophenone substantially free from impurities and being characterized in that it possesses the physiological ability to exert a local anesthetic effect, an epidural anesthetic effect in domestic animals and the ability to control the canine tremor-rigidity syndrome.

3. The compound 4-isobutoxy-beta-(1-piperidyl)propiophenone substantially free from impurities and being characterized in that it possesses the physiological ability to exert a local anesthetic effect, an epidural anesthetic effect in domestic animals and the ability to control the canine tremor-rigidity syndrome.

4. The compound 4-n-propoxy-beta-(1-piperidyl)propiophenone substantially free from impurities and being characterized in that it possesses the physiological ability to exert a local anesthetic effect, an epidural anesthetic effect in domestic animals and the ability to control the canine tremor-rigidity syndrome.

5. A pharmaceutical preparation comprising a relatively non-toxic and relatively non-sensitizing pharmaceutical carrier having incorporated therein a minor proportion of a compound of the group consisting of those represented by the following general formula:

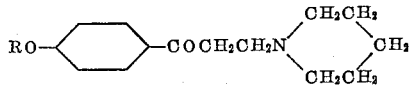

where R represents an alkyl group containing from two to eight carbon atoms, and their salts with acids being substantially free from impurities, said compound being characterized in that it possesses the physiological ability to exert a local anesthetic effect, an epidural anesthetic effect in domestic animals and the ability to control the canine tremor-rigidity syndrome.

6. A pharmaceutical preparation comprising a relatively non-toxic and relatively non-sensitizing pharmaceutical carrier having incorporated therein a minor proportion of the compound 4-n-butoxy-beta-(1-piperidyl) propiophenone, said compound being characterized in that it possesses the physiological ability to exert a local anesthetic effect, an epidural anesthetic effect in domestic animals and the ability to control the canine tremor-rigidity syndrome.

7. A pharmaceutical preparation comprising a relatively non-toxic and relatively non-sensitizing pharmaceutical carrier having incorporated therein a minor proportion of the compound 4-n-butoxy-beta-(1-piperidyl) propiophenone hydrochloride, said compound being characterized in that it possesses the physiological ability to exert a local anesthetic effect, an epidural anesthetic effect in domestic animals and the ability to control the canine tremor-rigidity syndrome.

8. A pharmaceutical preparation comprising a relatively non-toxic and relatively non-sensitizing pharmaceutical carrier having incorporated therein from about 0.1 percent to 5 percent of the compound 4-n-butoxy-beta-(1-piperidyl) propiophenone hydrochloride, said compound being characterized in that it possesses the physiological ability to exert a local anesthetic effect, an epidural anesthetic effect in domestic animals and the ability to control the canine tremor-rigidity syndrome.

References Cited in the file of this patent

UNITED STATES PATENTS

| | | |
|---|---|---|
| 2,649,444 | Barrett | Aug. 18, 1953 |
| 2,680,115 | Ruddy | June 1, 1954 |

FOREIGN PATENTS

| | | |
|---|---|---|
| 265,665 | Switzerland | Apr. 1, 1950 |

OTHER REFERENCES

Profft-Chemische Technik (Berlin), vol. 3, pgs. 210–13), (1951), abstracted in Chemical Abstracts, vol. 46, col. 688(b) 1951.

Stradlinger-Pharmazeutische Zentralhalle, vol. 90, pgs. 321–31 (1951).

Rabe et al.: Chemische Berichte, vol. 81, pg. 151 (1948).

Pharm. Zentralhalle, vol. 90, May 1951 (Advt.), pg. ii.

Stadlinger: Chemical Abstracts, vol. 46, April 10, 1952, column 3216. (Copy in Sci. Libr.).